United States Patent
Smithwick et al.

(10) Patent No.: US 11,347,058 B2
(45) Date of Patent: May 31, 2022

(54) WIDE FIELD OF VIEW OCCLUSION CAPABLE AUGMENTED REALITY PANCAKE OPTICS HEAD MOUNTED DISPLAY

(71) Applicant: Disney Enterprises, Inc., Burbank, CA (US)

(72) Inventors: Quinn Yorklun Jen Smithwick, Pasadena, CA (US); Scott F. Watson, Marina del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 345 days.

(21) Appl. No.: 16/518,857

(22) Filed: Jul. 22, 2019

(65) Prior Publication Data
US 2020/0117007 A1    Apr. 16, 2020

Related U.S. Application Data

(60) Provisional application No. 62/746,443, filed on Oct. 16, 2018.

(51) Int. Cl.
*G02B 27/01* (2006.01)
*G02B 27/28* (2006.01)
*G02F 1/1334* (2006.01)
*G02B 5/30* (2006.01)

(52) U.S. Cl.
CPC ....... *G02B 27/0172* (2013.01); *G02B 5/3025* (2013.01); *G02B 5/3083* (2013.01); *G02B 27/283* (2013.01); *G02F 1/1334* (2013.01); *G02B 2027/013* (2013.01)

(58) Field of Classification Search
CPC .......... G02B 27/0172; G02B 27/283; G02B 5/3025; G02B 5/3083; G02B 2027/013; G02F 1/1334
USPC ..................................... 359/485.01
See application file for complete search history.

(56) References Cited

U.S. PATENT DOCUMENTS

| 9,555,589 | B1 * | 1/2017 | Ambur | ............... G02B 13/0055 |
| 11,036,109 | B2 * | 6/2021 | Oh | ........................... G02B 5/20 |
| 2018/0107000 | A1 * | 4/2018 | Sung | ........................ G02B 3/14 |
| 2019/0384045 | A1 * | 12/2019 | Yun | ....................... G02B 27/28 |

* cited by examiner

*Primary Examiner* — Collin X Beatty
(74) *Attorney, Agent, or Firm* — Patterson + Sheridan, LLP

(57) ABSTRACT

Embodiments provide for a display system that overlays augmented reality (AR) content onto a view of an environment. The display includes a first polarizer that receives light providing a view of the environment (which can be natural light or light generated from another display). The polarized light then passes through a transparent display that emits light forming the AR content. The light emitted by the display and the polarized light of the environment pass through a beam splitter before reaching a selective mirror. The polarized light from the environment passes through the selective mirror while the light from the display is reflected back towards the beam splitter where it is collimated. Moreover, when collimating the light, the beam splitter also reflects the light back towards the selective mirror and changes its polarization so the light can pass through the selective mirror.

17 Claims, 9 Drawing Sheets

WIDE FIELD OF VIEW OCCLUSION CAPABLE AUGMENTED REALITY PANCAKE OPTICS HEAD MOUNTED DISPLAY

CROSS-REFERENCE TO RELATED APPLICATIONS

This application claims benefit of U.S. provisional patent application Ser. No. 62/746,443 filed Oct. 16, 2018, which is herein incorporated by reference in its entirety.

BACKGROUND

Field

The present disclosure generally relates to computer-based entertainment, and more specifically to optical arrangements suitable for augmented reality (AR) and/or virtual reality (VR) display devices.

DESCRIPTION OF THE RELATED ART

Computer graphics technology has significantly progressed since the first video games were developed. Relatively inexpensive 3D graphics engines can now produce nearly photo-realistic interactive virtual environments. Virtual reality (VR) in particular involves generating images, sounds, etc. that simulate a user's presence in a virtual environment, typically using specialized equipment such as VR headsets. In contrast, augmented reality (AR) involves superimposing computer generated imagery on a user's view of the real-world environment.

VR/AR head-mounted displays, as well as other types of displays such as those of flight simulators, can require a wide field of view and high resolution with a large eyebox. A simple magnifier is one approach for making a wide field of view, high-resolution display with a large eyebox. A display device with a simple magnifier typically includes a display disposed at a focal plane of a lens or mirror element that collimates light emitted by the display, making the displayed imagery appear to be "at infinity," or very far away. The longer the focal length of the lens or mirror element, the larger the eyebox, making for easier eye alignment. However, a display device with such a lens or mirror is also longer and larger, which can be undesirable. For example, the length/size of a head-mounted display with a simple magnifier creates a moment pulling the head-mounted display downward, which is not comfortable for the wearer and can create eye alignment problems. Such a moment can be counter balanced, but adding a counter balance also adds to the weight of the head-mounted device on the user's head.

To reduce the focal length, some VR/AR display systems use simple polarization elements to fold the inline path that light would take. The resultant system is more compact. However, the images produced can be dim because the light within the system is repeatedly reflected and transmitted through various optical components that remove a portion of the light.

SUMMARY

One embodiment described herein is a display system that includes a first polarizer element arranged to polarize background light received at the display system and a display arranged in-line with the first polarizer element where the display is configured to emit light forming an augmented reality (AR) object and permit at least a portion of the background light to pass through the display, and where, after passing through the display the background light has a different polarization than the emitted light. The display system also includes a beam splitter arranged to receive the emitted light and the background light, a second polarizer element where the beam splitter is disposed between the display and the second polarizer element, and a selective mirror configured to permit a first polarization of light to pass therethrough but reflect a second polarization of light, wherein the second polarizer element is between the beam splitter and the selective mirror.

Another embodiment described herein is a AR device that includes a first polarizer element arranged to polarize background light received at the AR device, a transparent display arranged to receive, and permit to pass through, the background light, where the display is configured to emit light forming an AR object, a beam splitter arranged to receive the emitted light and the background light, wherein the emitted light and the background light have orthogonal polarizations, a second polarizer element where the beam splitter is disposed between the display and the second polarizer element, and a selective mirror where the second polarizer element is between the beam splitter and the selective mirror.

Another embodiment described herein is a method that includes polarizing background light entering an AR display system from an environment, emitting light to form an AR object to overlay on a view of the environment, passing the background light and the emitted light through a beam splitter where the background light has a polarization that is orthogonal to a polarization of the emitted light, passing the background light through a selective mirror, reflecting the emitted light from the selective mirror back towards the beam splitter, collimating the reflected emitted light at the beam splitter and changing its polarization to the polarization of the background light, and passing the collimated emitted light through the selective mirror.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Various embodiments of augmented reality (AR) display devices with pancake optics are disclosed herein.

Figure 1:
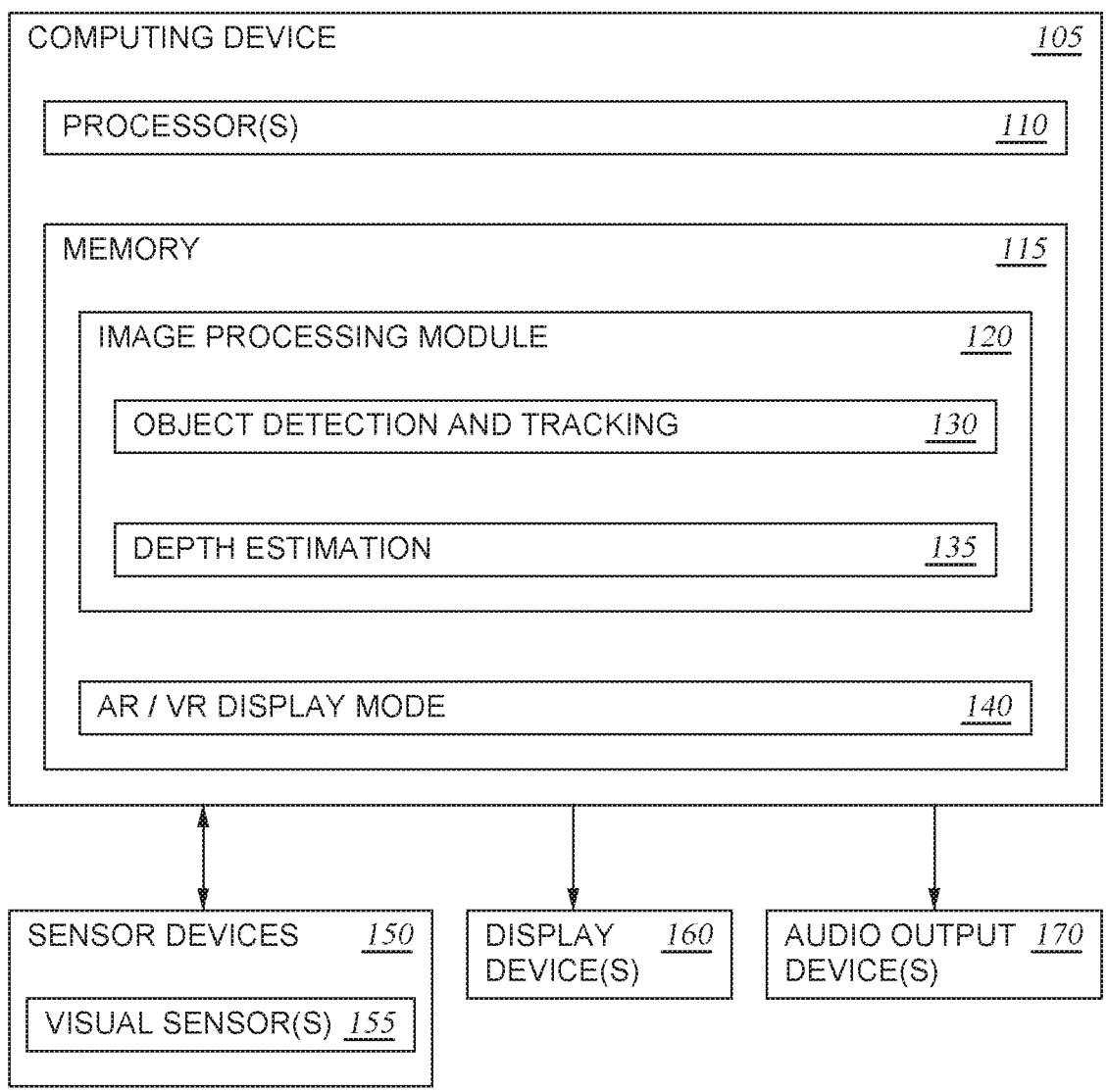
FIG. 1 illustrates a system that includes a display device with modified pancake optics, according to an embodiment.

FIG. 1 illustrates an example interactive environment that includes a display device with pancake optics, according to an embodiment. Within a system 100, a computing device 105 communicates with one or more sensor devices 150, one or more display devices 160, and one or more audio output devices 170. The computing device 105 may provide an augmented reality (AR) display functionality for a user in the interactive environment. The computing device 105 may be embodied in any suitable form. For example, the computing device 105 may be a body-worn computing device, e.g., integrated into an assembly worn on the head, arm, etc. of a user. As another example, the computing device 105 may be a mobile computing device, such as a smartphone, tablet, etc., that can be physically and removably attached with a body-worn assembly.

As shown, the computing device 105 includes a processor 110 and memory 115. The processor 110 generally retrieves and executes programming instructions stored in the memory 115. The processor 110 is included to be representative of a single central processing unit (CPU), multiple CPUs, a single CPU having multiple processing cores, and/or graphics processing units (GPUs) having multiple execution paths, and the like. The memory 115 is generally included to be representative of a random access memory, but may further include non-volatile storage of any suitable type(s).

The sensor devices 150 may be of any suitable type(s) and configured to sense information regarding the physical environment. Some examples of sensor devices 150 include visual sensors 155, pressure sensors, acceleration sensors, and temperature sensors. The visual sensors 155 may include cameras configured to sense visible light and/or infrared light. In some embodiments, the sensor devices 150 may be included with (or within) the computing device 105. For example, where the computing device 105 is a smartphone or tablet device, the sensor devices 150 may include camera(s), inertial motion units (IMUs), etc. within the smartphone/tablet device. In some embodiments, the sensor devices 150 include sensor(s) that are external to the computing device 105, such as a visual sensor within a head-worn device.

The memory 115 further includes an image processing module 120 configured to perform processing of visual information captured by the visual sensors 155. The image processing module 120 may include any number of image processing functions, such as an object detection and tracking sub-module 130 configured to detect physical objects within the interactive environment (e.g., based on edge detection information, color information, and/or other suitable features) and to track the relative location of detected objects over time (e.g., as a user and/or the objects move throughout the interactive environment). As shown, the image processing module 120 further includes a depth estimation sub-module 135 configured to dynamically estimate distances of the detected objects from the user.

The system 100 also includes one or more display devices 160, and one or more audio output devices 170. The display devices 160 may include visual displays of any suitable type. In some embodiments, the display devices 160 may be included within the computing device 105 (e.g., a main display screen of the smartphone, tablet device, etc.). In other embodiments, the display devices 160 may be separate from the computing device 105. The display devices 160 may each be any type of transparent display capable of displaying a visual interface to a user, and each of the display devices 160 may include any type of transparent light emitting diode (LED), organic LED (OLED), liquid crystal display (LCD) w/transparent backlight, plasma, electroluminescence (EL), or other display technology, as well an arrangement of optical elements that cooperate to provide an image to the user. The optical arrangements in the display devices 160 are configured to transmit some or all of the light emitted by an LED, OLED, LCD, plasma, EL, or other display to the user's eyes. The optical arrangement is further configured to transmit some or all of the light from the physical environment to the user's eyes. It should be understood that it is generally beneficial to design an AR display to be brighter and have a relatively small size and weight. Brighter displays may be relatively easier and more pleasant to view. At the same time, smaller and lighter body-worn displays allow for use by younger users or other users with reduced size and/or strength, by reducing the moment pulling the AR/VR display down that may otherwise produce user discomfort and eye alignment problems. A compact design may also reduce manufacturing costs through reduced material and process requirements, as well as be more aesthetically pleasing compared to a large or bulky design.

The display devices 160 may be integrated into a body-worn device such as a headset, and the display devices 160 may be configured as an eyepiece or lens worn in front of the user's eye. In another example, the display devices 160 may be integrated into other devices that are carried or handled by the user, or have any other suitable user interaction. For example, the user may carry a toy blaster that includes an optical sight for aiming, and the display devices 160 may be integrated in the optical sight. Although discussed primarily with respect to display devices that are head-mounted displays, it should be understood that optical arrangements disclosed herein may generally be beneficial in, e.g., any applications where thickness of a display device is constrained and a wide field of view and brightness are required or desired. For example, optical arrangements disclosed herein may be included in flight simulators, wall or car-mounted display devices, and multi-person display devices (e.g., a porthole in a submarine that includes a display), among other things.

The audio output devices 170 may include conventional audio speakers having any suitable form factor (e.g., standalone, integrated in a stereo, headphones, etc.), as well as devices using alternative methods of producing sound perceptible by a user, such as bone conduction transducers in a body-worn device. In some embodiments, the audio output devices 170 may be included within the computing device 105 (e.g., speakers of the smartphone, tablet device, etc.). In other embodiments, the audio output devices 170 may be separate from the computing device 105.

In augmented reality virtual images, characters, objects, and/or dynamic visual effects are superimposed into the user's natural field of view of the environment using the display device 160. The field of view of the user may be determined using sensor devices 150 such as the visual sensors 155. For example, the display device 160 may superimpose a virtual character to appear seated on a physical chair detected within the environment. The display of the virtual character on the display device 160 may then be dynamically adjusted based on the user's field of view (orientation), the determined distance of the chair from the user, and so forth.

FIGS. 2-6 illustrate in greater detail one or more of the display devices 160, according to various embodiments. Although not explicitly shown, it should be understood that the optical arrangements of the display devices depicted in FIGS. 2-6 may in some embodiments include independent optics for each eye of a viewer. Further, some embodiments may be provisioned with independent optics (e.g., one per eye) and some shared optics (e.g., one for both eyes). Although examples of specific optical elements may be discussed, it should be understood that optical elements disclosed herein may generally be manufactured from any suitable material in any feasible manner, so long as the optical elements have the properties (e.g., linear polarization selectiveness, circular polarization selectiveness, etc.) described herein. In addition, the features described with respect to a particular implementation may be beneficially applied to other implementations without requiring an explicit recitation.

Figure 2:
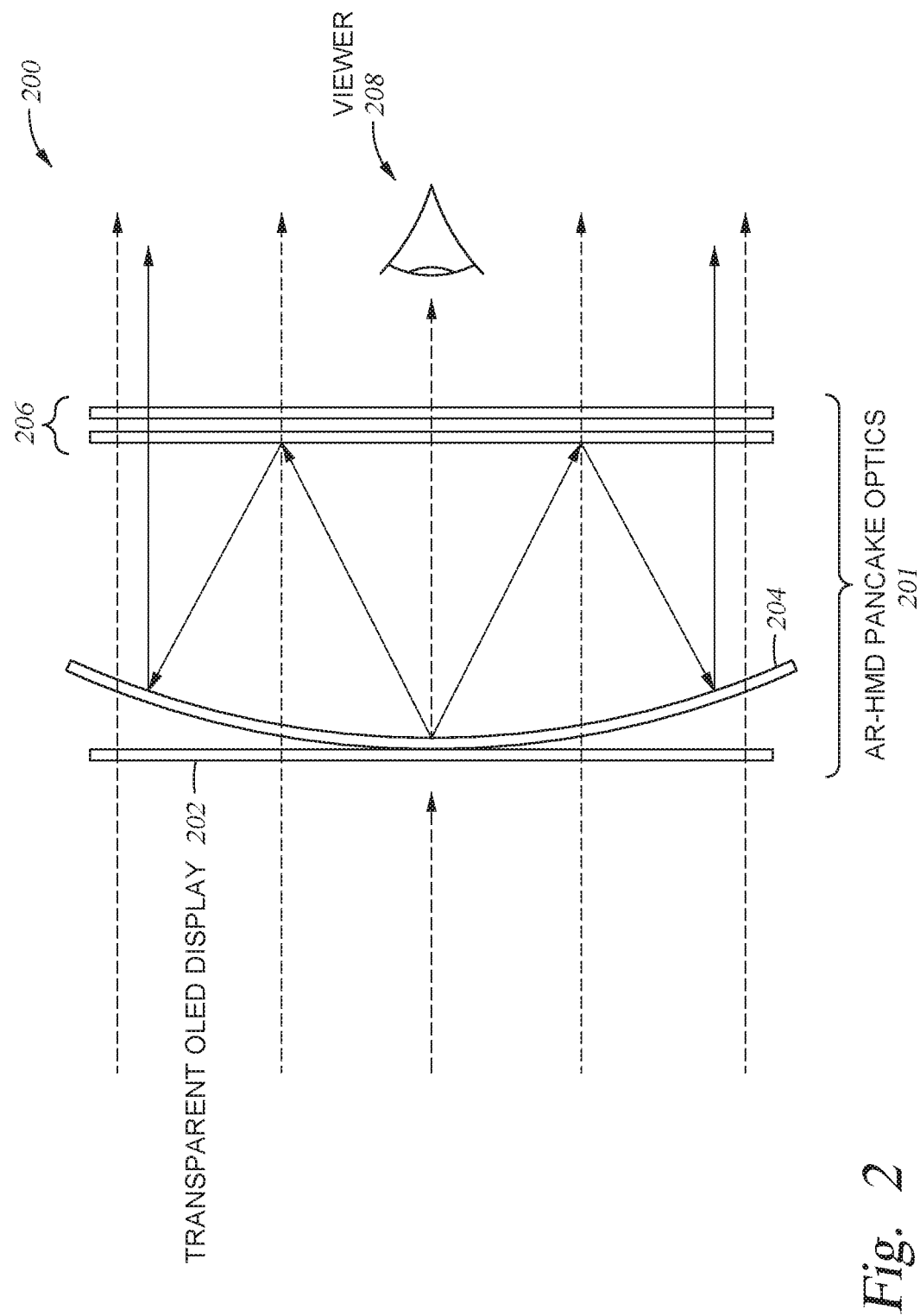
FIG. 2 illustrates a display device with pancake optics, according to an embodiment.

FIG. 2 illustrates a simplified side view of a display system 200 with pancake optics arrangement 201, according to a first embodiment. The arrangement 201 of optical elements generally includes a display 202, a 50/50 (half-silvered) concave beam splitter 204, and an optical assembly 206 between the concave beam splitter element and a viewer 208. The display 202 is a transparent OLED. In one embodiment, light emitted from the OLED display 202 is polarized by the provision of a patterned polarizer (not shown; also referred to herein as a "mask") between the OLED transmitters and the concave beam splitter 204. It is also contemplated that the OLED display may itself be capable of emitting polarized light, in one embodiment. In that case, the patterned polarizer/mask is not needed. Although depicted as flat for illustrative purposes, in some embodiments the display 202 may have a cylindrical, compound, or free-form curve shape, which counteracts the optical system's field curvature and may produce a better image quality with less distortion.

FIG. 2 is intended to conceptually illustrate the manner in which light from the ambient environment (background light) and light emitted by the display 202 propagates through the display system 200 to produce a desired viewing experience for the viewer 208. Specifically, at least a portion of the background collimated light (shown with dashed lines) is allowed to propagate through the display system 200 (e.g., an optical arrangement) without reflection. The light emitted by the display 202 (shown in solid lines) is collimated by the display system 200, so as to appear at infinity to the viewer 208.

Figure 3:
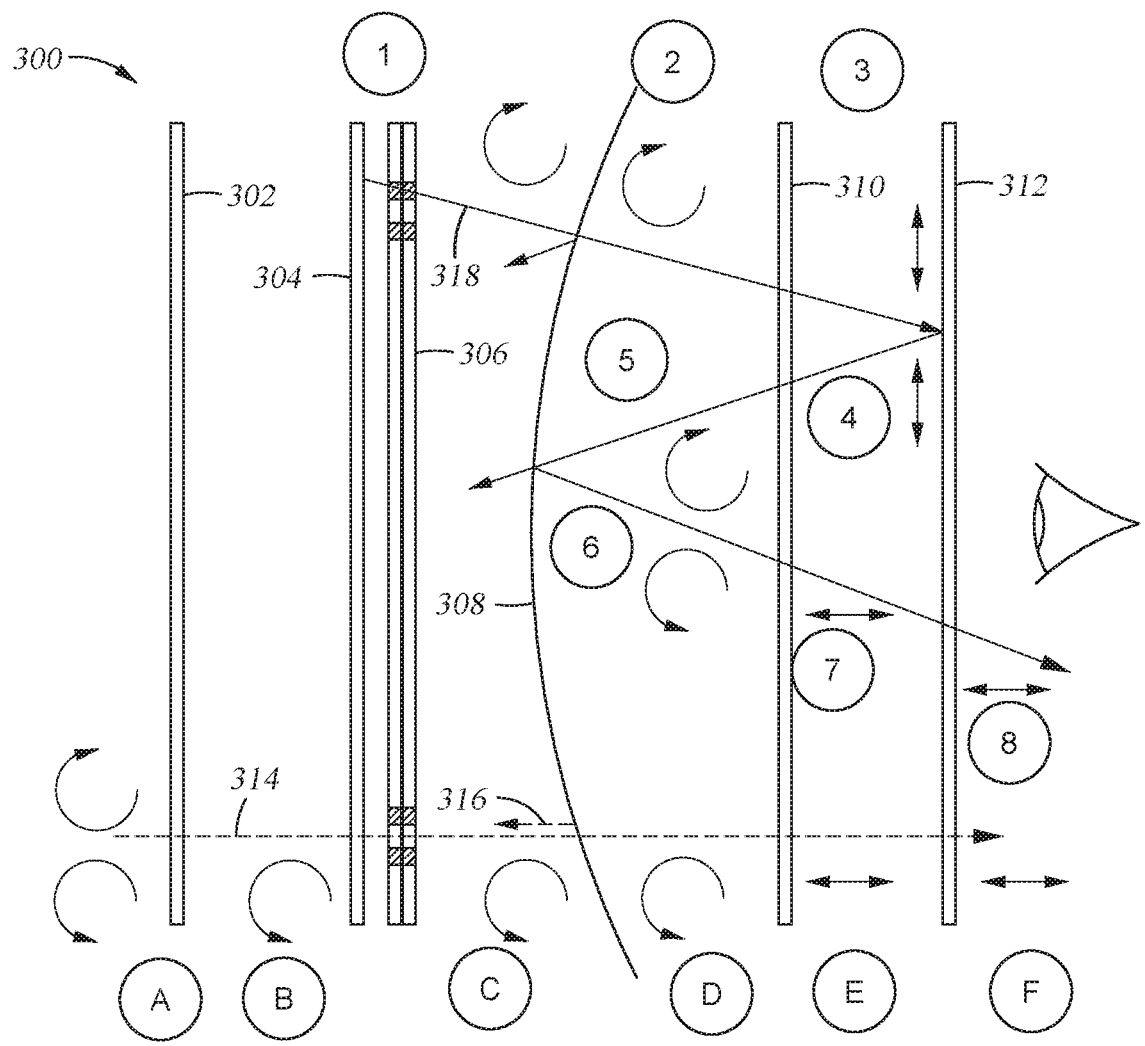
FIG. 3 is an exploded view of a display device with pancake optics, according to an embodiment.

FIG. 3 is an exploded view of a display device 300 capable of producing the results described above with respect to FIG. 2. That is, the display device 300 (e.g., an optical arrangement) is one embodiment of the display device 200 shown in FIG. 2. As shown, the display device 300 includes a left circular polarizer 302, a transparent OLED display 304, a mask 306, a 50/50 concave beam-splitter 308, a quarter-wave retarder 310, and a polarization selective mirror 312. The mask 306 is a matrix of circular polarizers of alternating orthogonal directionality. That is, viewed in cross-section, the mask includes a row of circular polarizers of alternating handedness. Illustratively, the hashed regions indicate right circular polarizers, while the white regions indicate left circular polarizers. In this particular embodiment, the right circular polarizers (the hashed regions) are aligned with the OLED emitters. The left circular polarizers are aligned with the spaces between emitters. As a result, light emitted by the OLED emitters is right circular polarized upon passing through the mask 306, while background light passing through the spaces between the emitters is left circular polarized. It should be noted that while the embodiment of FIG. 3 includes an OLED display, other embodiments may include micro LED displays. In other embodiments, rather than micro LED displays (e.g., micro OLED displays) or emissive, transparent LED/OLED displays (e.g., tOLED displays), a projector and a polarization screen could be used as a transparent display to provide the AR content.

Moreover, if the OLED or microLEDs are already emit polarized light (either inherently or through an integrated polarization filter), then the micropolarizer array may not be necessary. The background light will be left circularly polarized by polarizer 302 (e.g., a first polarizer element), then either pass through or pass around the OLED or microLED emitters (some are emitters are transparent). The system will work as long as the background is one circular polarization handedness and the display is the orthogonal circular polarization handedness.

Also, the background can be vertically polarized by the polarizer 302, and the OLED or microLED could emit (or be filtered to pass) horizontally polarized light. In that case, the background light and display light can be made into orthogonal circularly polarized light by passing them through a ¼ wave retarder right after the mask 306 but before the beam-splitter 308.

For the benefit of explanation, FIG. 3 is annotated with a plurality of stages, A-F, where A represents the ambient environment which is the source of background light. The polarization of background light is random. Accordingly, FIG. 3 illustrates both left-handed and right-handed polarized background light (other orientations are present but not shown). An exemplary propagation path of background light 314 is shown as a linear dashed arrow (also referred to herein as the ray 314), and its polarization prior to entering the display device 300 is illustrated as clockwise and counterclockwise arrows. Background light enters the display device 300 through the left circular polarizer 302 which passes left-handed circularly polarized light and blocks right-handed circularly polarized light (stage B). The ray 314 then passes through the transparent OLED display 304 and then through the mask 306. In particular, the ray 314 illustrates the propagation path of background light in-between emitters of the OLED display 304 and, hence, through a left circular polarizer of the mask 306. Because the ray 314 is already left circular polarized, the ray 314 propagates through the mask 306 without modification (stage C). Although not shown in FIG. 3, a portion of the outside light will be incident on the array of emitters, which in some implementations are non-transmissive to light and thus will prevent that light from propagating on to the viewer (although some newer transparent OLEDs are fully transparent to background light where background light passes through the entire pixel). The circularly polarized light that passes through or between the emitters of the mask, e.g., the light represented by the ray 314, is then incident on the beam-splitter 308, which allows half of the light to pass through while reflecting the other half of the light (indicated by the reverse arrow 316). At this stage (stage D) the light is still left polarized. The ray 314 then passes through the quarter wave retarder 310 (e.g., a second polarizer element) where it becomes vertically polarized (as represented by the vertical bidirectional arrow at stage E). The vertically polarized light is then incident on the polarization selective mirror 312. The polarization selective mirror 312 is configured to pass vertically polarized light and reflect horizontally polarized light. Any suitable type of linearly polarization-selective mirror may be used, such as a wire grid polarizer, stretched polymer or a multilayer Bragg reflector. Accordingly, the vertically polarized light ray 314 passes through the polarization selective mirror 312 (stage F) and ultimately to the viewer's eye. Thus, the propagation path of the ray 314 illustrates that background light passes through the display device 300 without being folded or being affected by the beam splitter's 308 optical power.

The propagation path of light from the emitters of the display 304 will now be described. For this purpose, it will be assumed that the light from the emitters is randomly polarized, although in some implementations, the emitters are either inherently polarized or have built-in polarizers. As noted above, each emitter is registered with a corresponding right circular polarizer formed in the mask 306. Accordingly, light produced by a given emitter passes through its corresponding right circular polarizer in the mask 306, resulting in right circular polarized light at stage C. The output light (represented for a particular emitter as light ray 318) then propagates to the 50/50 concave beam-splitter 308. The beam-splitter 308 passes half of the light 318 and reflects the other half. The portion of the light that passes through the beam-splitter 308 remains right hand polarized and then propagates to the quarter wave retarder 310. The light 318 passes through the quarter wave retarder 310 and becomes horizontally polarized. The horizontally polarized light 318 is then reflected off of the polarization selective mirror 312 (which does not change its polarity) back to the quarter wave retarder 310. Propagation through the quarter wave retarder 310 causes the horizontally polarized light 318 to become right hand circular polarized again. The light 318 is then incident on the beam-splitter 308. A portion of the light 318 passes through the beam-splitter 308, while the other half is reflected causing an orthogonal change in its polarity—in this case, from right-handed circular polarized to left-handed circular polarized. The light 318 is now collimated due to the optical power of the beam-splitter 308, and the display being at the folded optical distance of the beam-splitter's focal length. The light 318 then propagates through the quarter wave retarder 310 whereupon the light becomes vertically polarized. Accordingly, the light is able to propagate through the polarization selective mirror 312 and ultimately onto the viewer. To the viewer, the image from the display appears combined with or overlaid onto the background, and both the display image and background appear to be focused at "infinity" or at some distance.

Figure 4A:
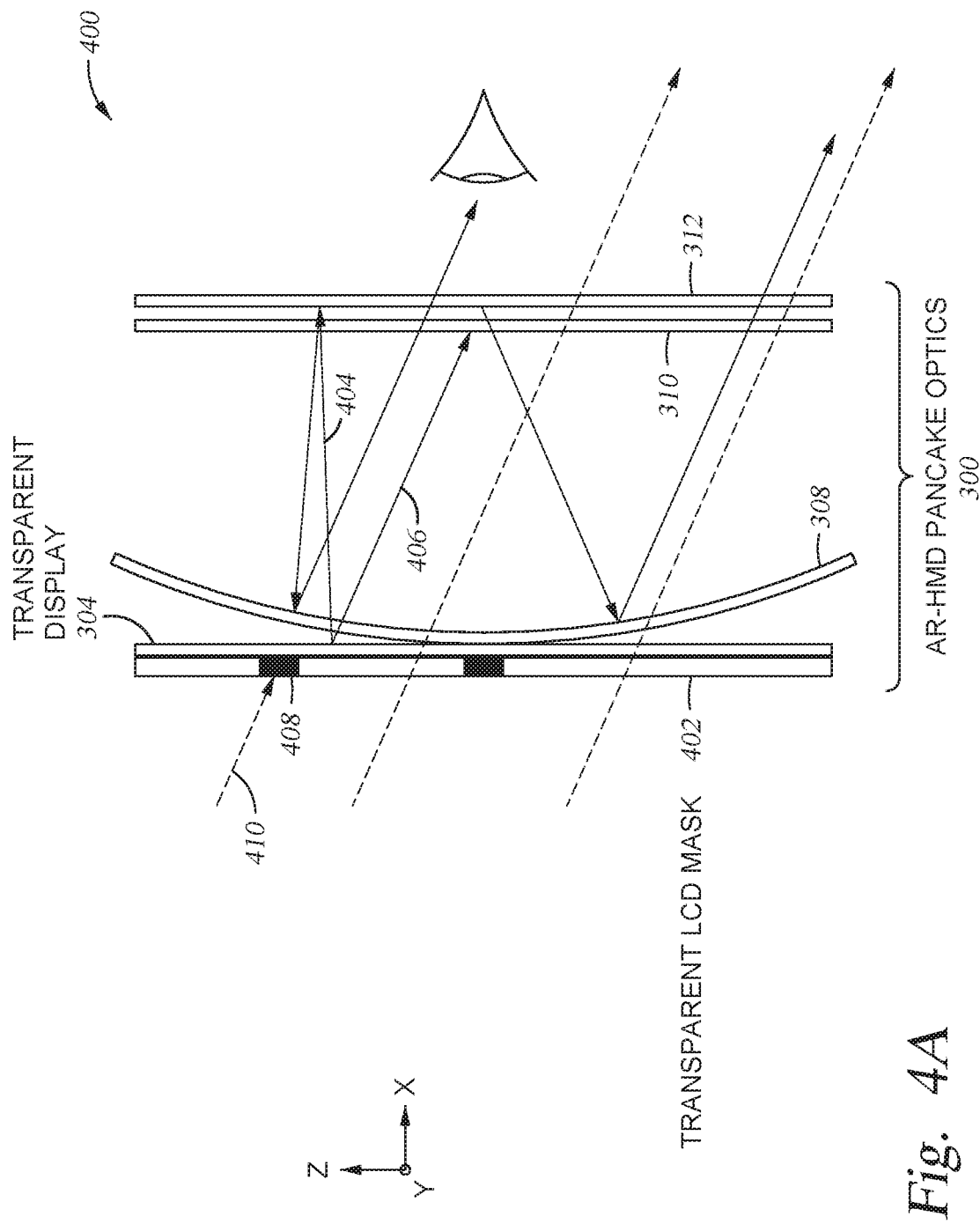
FIGS. 4A-C illustrate example implementations of a display device with pancake optics and an occlusion mask, according to various embodiments.
Figure 4B:
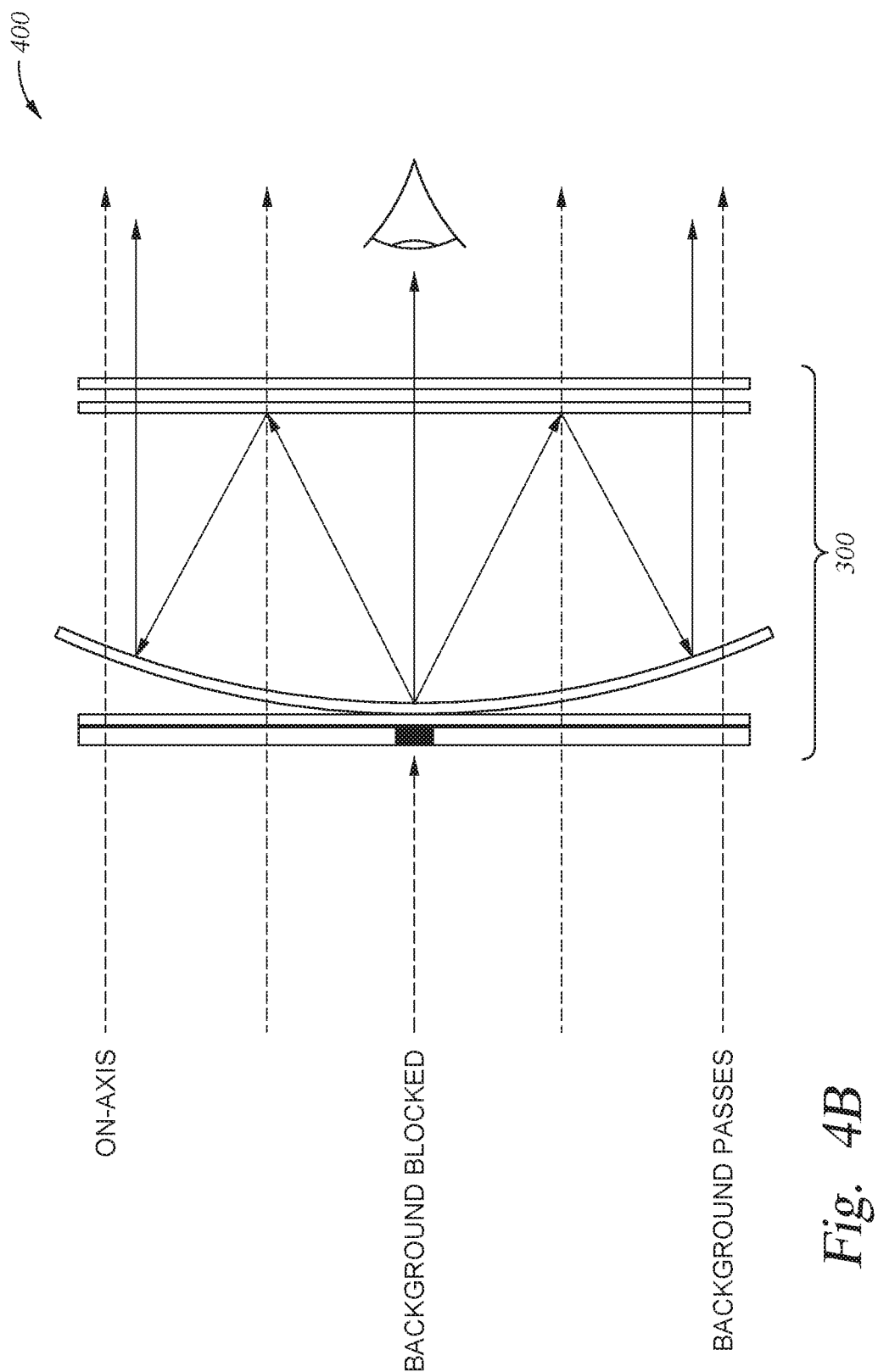
Figure 4C:
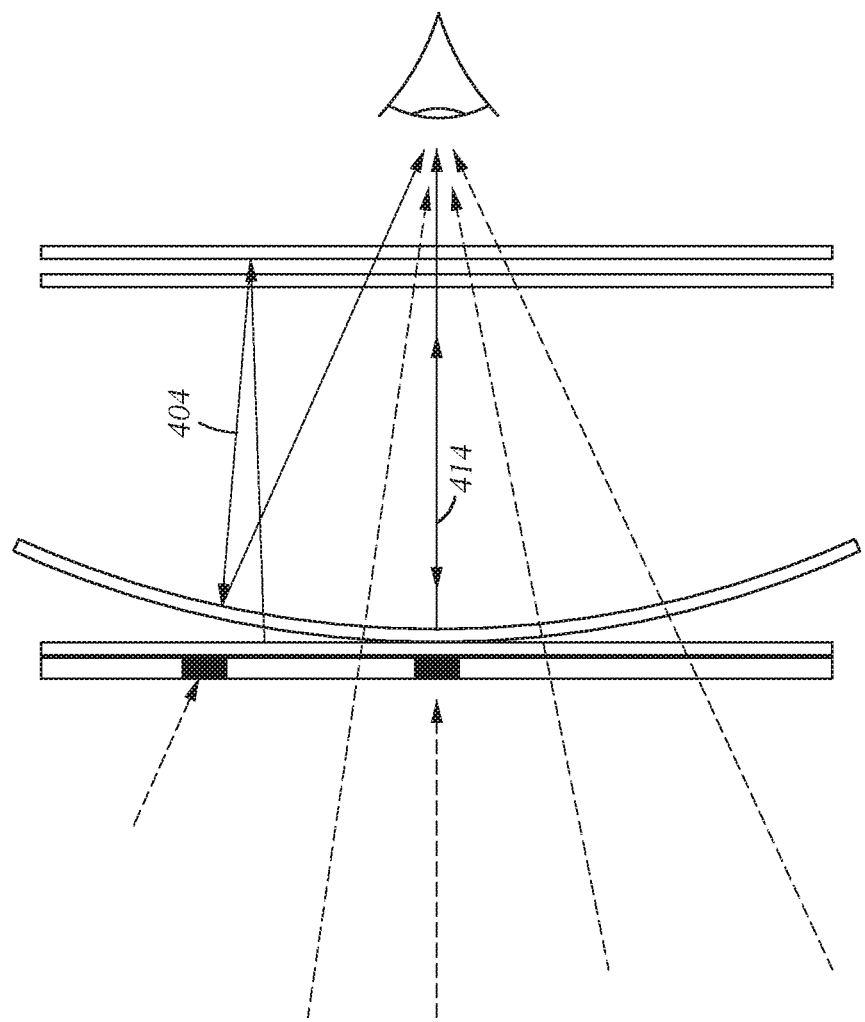

In some cases it may be desirable to improve the viewing experience by, e.g., reducing the transparency of content images (i.e., images produced by the display). FIGS. 4A-C show an embodiment of an occlusion capable AR-HMD (Augmented Reality Head Mounted Display) device 400 with a wide field of view. The device 400 is equipped with the optical arrangement of the device 300 of FIG. 3 (i.e., the "flipped" pancake optics), although some of the details of the device 300 have been removed for purposes of clarity. In addition to the optical arrangement of the device 300, the device 400 includes an occluder 402 disposed in front of the transparent display 304 (that is, on the side of the transparent display 304 that is further from the viewer). In one embodiment, the occluder 402 includes a transparent LCD mask having pixels that are capable of being selectively activated to produce occluded regions that prevent the transmission of background light.

FIG. 4A shows an example of off-axis light entering the display 400 (that is, light propagating an angle relative to the orientation of the viewer's gaze). The dark regions (e.g., region 408) of the occluder 402 represent the activated occluded regions. Outside light incident on the occluded regions is blocked. Conversely, light incident on the unoccluded regions passes through the occluder 402 and through the pancake optics in the manner described above with respect to FIG. 3. Light emitted by a particular emitter is represented by a first ray 404 and a second ray 406. The first ray 404 represents light that will be overlaid over a portion of the occluded region 408. Thus, the display device 300 must condition the first ray 404 to be collimated and co-linear with a corresponding ray 410 that would have passed through the transparent display 304 but for the occluded region 408. The optical conditioning of the first ray 404 is the same as is described above with respect to light ray 318—i.e., the emitted light 404 is polarized by the mask (not shown here), propagates through the beam-splitter 308, through the quarter wave retarder 310, off of the polarization selective mirror 312, back through the quarter wave retarder 310, and back to the beam-splitter 308 where half of the light (with an orthogonal change in circular polarization) passes back through the quarter wave retarder 310 (where its polarization becomes vertical) and then through the polarization selective mirror 312.

It should be noted that for a given viewer position, there is a respective emitter that corresponds to the occluded point where a ray of background light is blocked. However, the respective emitter and the blocked ray are not on a co-linear path. For example, if allowed to propagate through the transparent display 304, the ray 410 does not intersect the emitter that produces the ray 404. Rather, the emitter responsible for emitting the ray 404 is vertically offset (in the z direction) relative to the emitter intersected by the unblocked ray 410. The mapping between occluded regions and the corresponding emitters to produce content overlaid on the occluded region can be predefined and or dynamically managed using, e.g., eye gazing technology.

Referring now to FIG. 4B, an on-axis example of the display device 400 is shown. Where the occluder 402 does not contain occluded regions, the background light passes through the display device 300 in the manner described above with respect to FIG. 3. In contrast, background light that strikes an occluded region (the dark region of the occluder 402) is blocked. The solid arrows illustrate rays of light emitted by the transparent display 304. The emitted light is collimated in the manner described above with respect to FIG. 3.

FIG. 4C represents a single viewpoint example of the display device 400. Here, the ray 404 of FIG. 4A is shown in combination with a plurality of off-axis background rays (shown in dashed lines), as well as an on-axis ray 414. Here, the on-axis ray 414 is emitted by the emitter of the transparent display 304 that is disposed on the central axis of the display device 300. Hence, the emitter and the corresponding occluded region are not offset, in contrast to the offset occluded region 408 and corresponding emitter of FIG. 4A.

In operation, the display device 400 allows the visual properties received by the viewer to be manipulated by selectively controlling the content properties and occlusion properties. For example, if black content is desired, the appropriate occlusion pixels can be turned on to render the corresponding region of the occluder 402 opaque by blocking the background light in turning the corresponding display emitters off. If a ghostly content affect is desired, no occlusion is added by the occluder 402, and light is added from the display 304. In this manner, the display device 400 can control opacity, brightness, etc.

Figure 5:
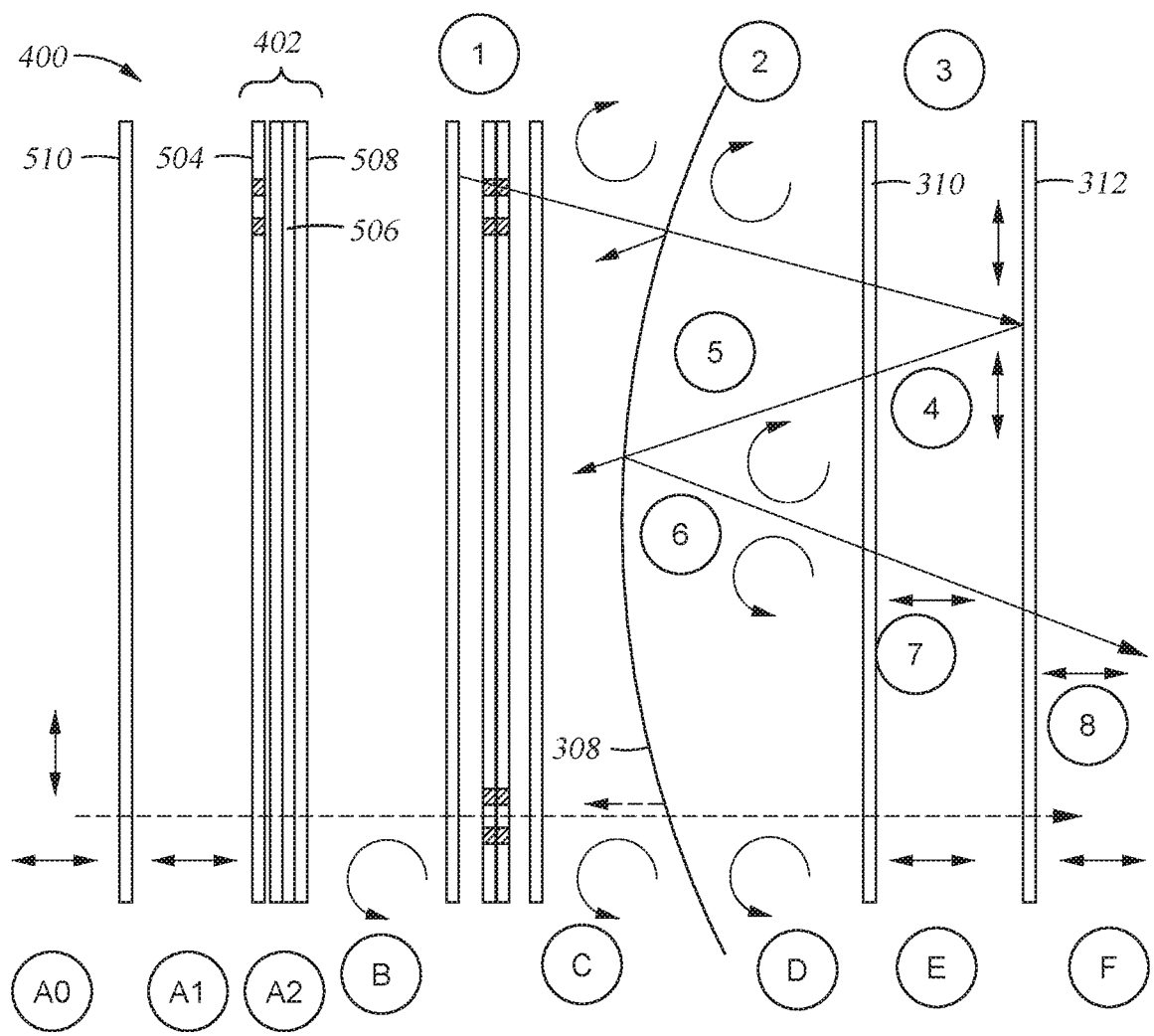
FIG. 5 illustrates an exploded view of a display device with pancake optics and an occlusion mask, according to an embodiment.

FIG. 5 shows a more detailed exploded view of the occlusion capable display device 400. In this embodiment, stages B-F of the display device 400 generally correspond to the stages B-F of the display device 300. Accordingly, like numbers are used where the components correspond to the device 300. Stage A, however, is expanded to A0-A2 to elaborate on the function of the occluder 402. Illustratively, the occluder 402 includes a transparent LCD panel 504, a vertical analyzer 506 and a quarter wave retarder 508. Upstream from the occluder 402 is a vertical polarizer 510 that replaces the circular polarizer 302 shown in FIG. 3. The vertical polarizer 510 is substituted for the circular polarizer 302 because LCD panels are typically configured to pass linearly polarized light and block circular polarized light. Thus, randomly polarized light at State A0 passes through the vertical polarizer 510 and is vertically polarized. The LCD panel 504 then selectively rotates the polarized light, after which the light propagates to the vertical analyzer 506, which is 90 degrees to the vertical polarizer 510 so that the vertical polarizer 510 blocks vertically polarized light and passes horizontally polarized light. Thus, if the LCD panel 504 does not rotate the light, then the light is blocked by the vertical polarizer 510; whereas if the LCD panel 504 does rotate the light to be horizontal, then the light is passed by the vertical polarizer 510. The light that passed through the vertical polarizer 510 is then incident on the quarter wave retarder 508. The quarter wave retarder 508 left-hand circular polarizes the incident horizontally polarized light. The resultant light passes through Stages B-F in the manner described above with respect to FIG. 3.

Figure 6:
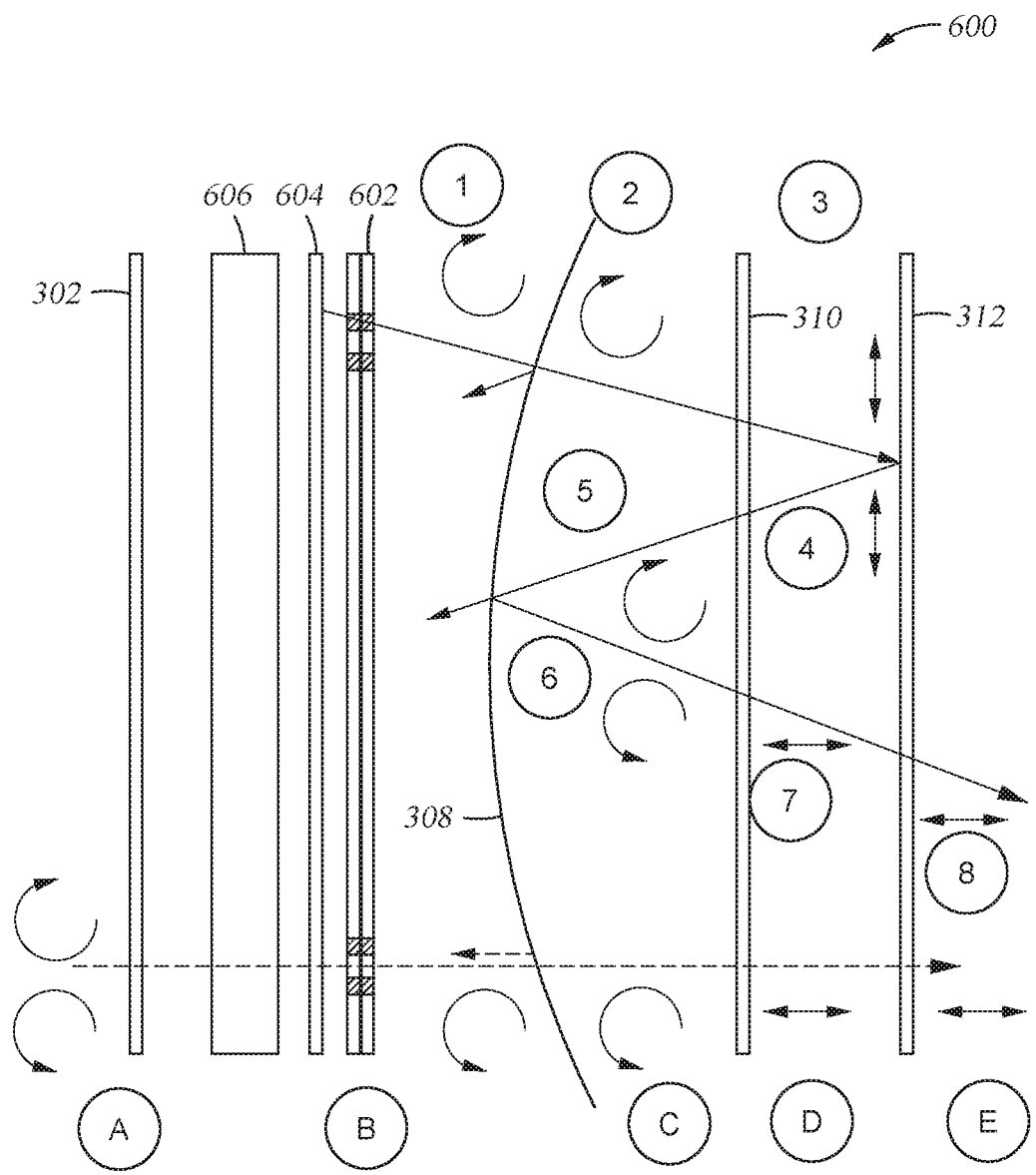
FIG. 6 shows an embodiment of a display device using an LCD panel to generate content, as well as operate as an occlusion mask, according to an embodiment.

Embodiments above illustrate A/R system using transparent OLEDs or transparent micro LEDs as the content display. In other embodiments, LCD panels can be used to generate the A/R content. FIG. 6 shows an embodiment of a display device 600 using an LCD panel 602 to generate content, as well as operate as an occluder. As applicable, like reference numbers are used to refer to like components described with reference to the device 300 of FIG. 3.

Because the LCD panel 602 does not emit its own light, the display device 600 is provisioned with a transparent light guide 604. A PDLC (polymer dispersed liquid crystal) panel 606 is disposed between the left circular polarizer 302 and the transparent light guide 604. In operation, the LCD panel 602, the transparent light guide 604, and the PDLC panel 606 cooperate to alternate between a content generation phase and a background/occlusion phase. The switching between the phases may occur at, e.g., 120 frames per second. During the content generation phase, the PDLC panel 606 is turned on to obfuscate incoming background light. At the same time, the light guide 604 is turned on to provide backlight to the LCD panel 602. The backlight is gated by the LCD panel 602 to generate the desired content for the viewer. During the background/occlusion phase, the PDLC panel 606 is turned off, thereby allowing the background light to pass through. LCD panel 602 can then be controlled to let all of the background light through, or partially occlude the background light. For example, the LCD panel 602 can selectively occlude the background light to produce corresponding silhouettes for content, as was described above with respect to FIGS. 4A-C and FIG. 5.

Advantageously, embodiments disclosed herein provide AR display devices that are brighter than display devices with traditional optics and have a relatively small size and weight. In particular, the optical arrangements discussed herein may be employed in, e.g., AR display devices which have constrained thicknesses and which are required (or desired) to produce a wide field of view and relatively bright images. For example, the optical arrangements described herein may be included in head-mounted displays, flight simulators, wall or car-mounted display devices, and multi-person display devices (e.g., a porthole in a submarine that includes a display), among other things.

Figure 7:
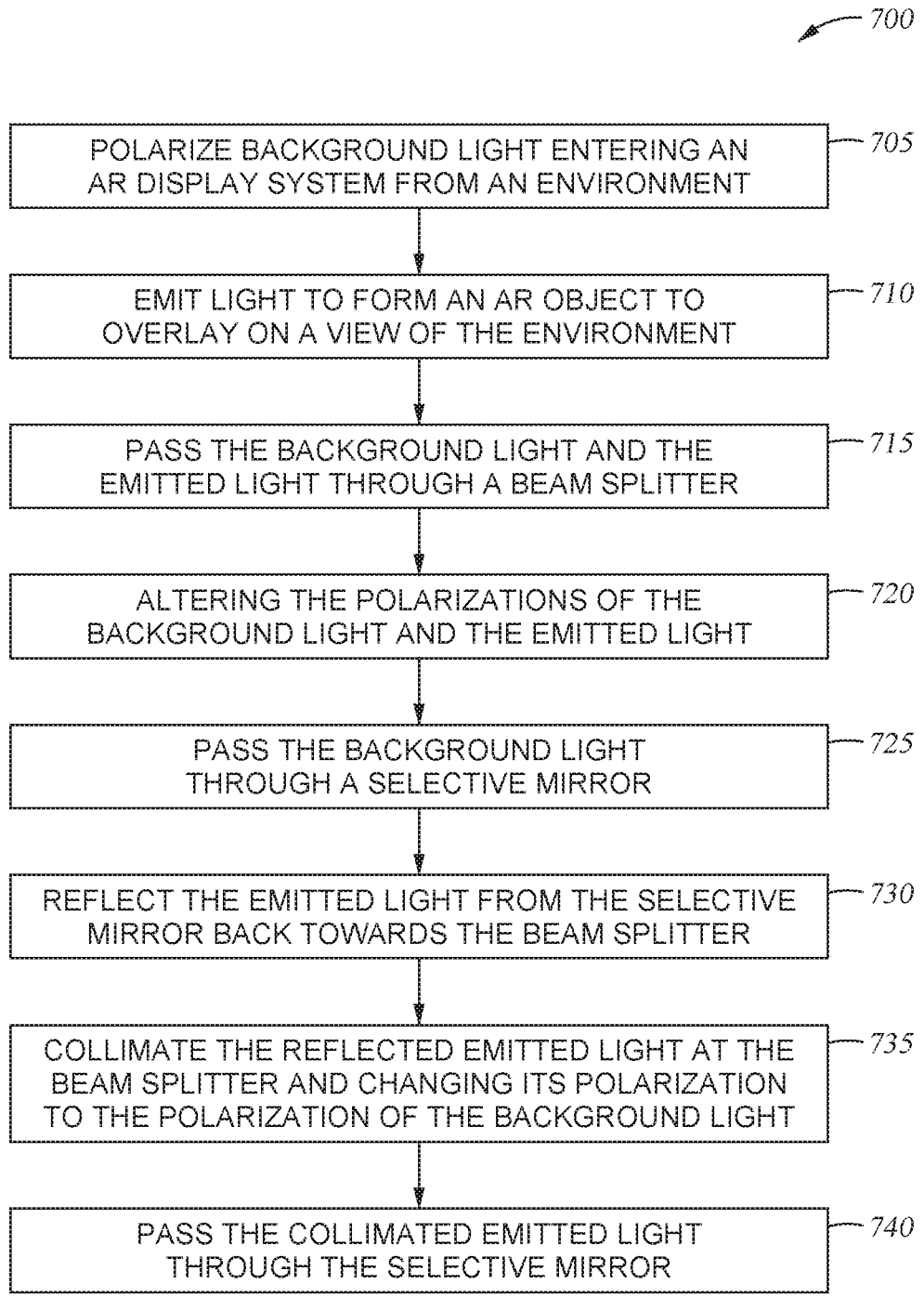
FIG. 7 is a flowchart for adding AR content to a view of an environment, according to an embodiment.

FIG. 7 is a flowchart of a method 700 for adding AR content to a view of an environment. At block 705, a first polarizer (e.g., polarizer 302) polarizes background light entering an AR display system from the environment. At block 710, a display in the AR display system emits light to form an AR object to overlay on the view of the environment. In one embodiment, the display is transparent (at least in the portions not emitting the light forming the AR object) such that at least a portion of the background light can pass therethrough. In another embodiment, the display may be what is illustrated in FIG. 6 where the display is transparent during some time periods to let the background light pass through and opaque during other times when the AR content is emitted.

At block 715, the background light and the emitted light pass through a beam splitter (although some of this light may be reflected by the beam splitter). At block 720, a second polarizer (e.g., quarter-wave retarder 310) alters the polarizations of the background light and the emitted light generated by the display. For example, the polarizer may change the polarizations from right and left circular polarizations to vertical and horizontal linear polarizations.

At block 725, the background light passes through the selective mirror and can be seen by a user. In contrast, at block 730, the selective mirror reflects the emitted light generated by the display, which has a different polarization than the background light, back towards the beam splitter. The reflected light may again pass through the second polarizer which changes its polarization.

At block 730, the beam splitter collimates the reflected emitted light and changes its polarization to the same polarization that the background light has when passing through the beam splitter. The collimated light again passes through the second polarizer (which yet again changes its polarization).

At block 735, the collimated light passes through the selective mirror. That is, the collimated light has the same polarization as the background light when reaching the selective mirror, and thus, can pass therethrough.

In the preceding, reference is made to embodiments of the disclosure. However, the disclosure is not limited to specific described embodiments. Instead, any combination of the preceding features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A display system, comprising:
a first polarizer element arranged to polarize background light received at the display system;
a display arranged in-line with the first polarizer element, wherein the display is configured to emit light forming an augmented reality (AR) object and permit at least a portion of the background light to pass through the display, wherein, after passing through the display the background light has a different polarization than the emitted light;
a beam splitter arranged to receive the emitted light and the background light;

a second polarizer element, wherein the beam splitter is disposed between the display and the second polarizer element;
a selective mirror configured to permit a first polarization of light to pass therethrough but reflect a second polarization of light, wherein the second polarizer element is between the beam splitter and the selective mirror; and
a mask disposed between the display and the beam splitter, wherein the mask comprises a plurality of controllable polarizers for polarizing the emitted light.

2. The display system of claim 1, wherein the mask is configured to (i) select a first subset of the plurality of controllable polarizers that are aligned with emitters in the display that are configured to generate the emitted light and (ii) select a second subset of the plurality of controllable polarizers aligned with spaces between the emitters.

3. The display system of claim 2, wherein the first subset polarizes the emitted light with a first circular polarization and wherein the first polarizer element polarizes the background light with a second circular polarization that is different from the first circular polarization.

4. The display system of claim 1, wherein the beam splitter is curved to collimate the emitted light that reflects off the selective mirror.

5. The display system of claim 4, wherein the beam splitter causes an orthogonal change of the polarization of the emitted light when collimating the emitted light.

6. The display system of claim 1, wherein the display is a transparent light emitting diode (LED) display.

7. The display system of claim 1, further comprising:
an occluder disposed between the display and the first polarizer element, wherein the occluder comprises pixels that are selectively activated to produce occluded regions that block the background light.

8. The display system of claim 7, wherein the occluder further comprises:
a transparent panel comprising the pixels;
an analyzer; and
a quarter wave retarder, wherein the analyzer is disposed between the transparent panel and the quarter wave retarder.

9. The display system of claim 1, wherein the display comprises: a polymer dispersed liquid crystal (PDLC) panel that is configured to turn on and off to selectively permit the background light to pass therethrough; a transparent light guide; and a liquid crystal display (LCD) panel, wherein the transparent light guide is configured to provide backlight to the LCD panel.

10. An augmented reality (AR) device comprising:
a first polarizer element arranged to polarize background light received at the AR device;
a transparent display arranged to receive, and permit to pass through, the background light, wherein the display is configured to emit light forming an AR object;
a beam splitter arranged to receive the emitted light and the background light, wherein the emitted light and the background light have orthogonal polarizations;
a second polarizer element, wherein the beam splitter is disposed between the display and the second polarizer element; and
a selective mirror, wherein the second polarizer element is between the beam splitter and the selective mirror, wherein the beam splitter is curved to collimate the emitted light that reflects off the selective mirror, and wherein the beam splitter causes an orthogonal change of the polarization of the emitted light when collimating the emitted light such that the emitted light has the same polarization as the background light when the background light passes through the beam splitter.

11. The AR device of claim 10, wherein the second polarizer element is a quarter wave retarder.

12. The AR device of claim 10, wherein the first polarizer element permits the background light with a first circular polarization to pass therethrough, and wherein the emitted light, when passing through the beam splitter, has a second circular polarization orthogonal to the first circular polarization.

13. The AR device of claim 10, further comprising:
a mask disposed between the display and the beam splitter, wherein the mask comprises a plurality of controllable polarizers for polarizing the emitted light to a polarization that is orthogonal to a polarization of the background light passing through the display.

14. The AR device of claim 10, further comprising:
an occluder disposed between the display and the first polarizer element, wherein the occluder comprises pixels that are selectively activated to produce occluded regions that block the background light.

15. A display system, comprising:
a first polarizer element arranged to polarize background light received at the display system;
a display arranged in-line with the first polarizer element, wherein the display is configured to emit light forming an augmented reality (AR) object and permit at least a portion of the background light to pass through the display, wherein, after passing through the display the background light has a different polarization than the emitted light;
a beam splitter arranged to receive the emitted light and the background light;
a second polarizer element, wherein the beam splitter is disposed between the display and the second polarizer element;
a selective mirror configured to permit a first polarization of light to pass therethrough but reflect a second polarization of light, wherein the second polarizer element is between the beam splitter and the selective mirror;
a mask disposed between the display and the beam splitter, wherein the mask comprises a plurality of controllable polarizers for polarizing the emitted light; and
an occluder disposed between the display and the first polarizer element, wherein the occluder comprises pixels that are selectively activated to produce occluded regions that block the background light.

16. The display system of claim 15, wherein the occluder further comprises:
a transparent panel comprising the pixels;
an analyzer; and
a quarter wave retarder, wherein the analyzer is disposed between the transparent panel and the quarter wave retarder.

17. A display system, comprising:
a first polarizer element arranged to polarize background light received at the display system;
a display arranged in-line with the first polarizer element, wherein the display is configured to emit light forming an augmented reality (AR) object and permit at least a portion of the background light to pass through the display, wherein, after passing through the display the background light has a different polarization than the emitted light;

a beam splitter arranged to receive the emitted light and the background light;
a second polarizer element, wherein the beam splitter is disposed between the display and the second polarizer element;
a selective mirror configured to permit a first polarization of light to pass therethrough but reflect a second polarization of light, wherein the second polarizer element is between the beam splitter and the selective mirror; and
a mask disposed between the display and the beam splitter, wherein the mask comprises a plurality of controllable polarizers for polarizing the emitted light,
wherein the first polarizer element permits the background light with a first circular polarization to pass therethrough, and wherein the emitted light, when passing through the beam splitter, has a second circular polarization orthogonal to the first circular polarization.

* * * * *